United States Patent
Abati et al.

(10) Patent No.: US 12,266,179 B2
(45) Date of Patent: Apr. 1, 2025

(54) EFFICIENT SELF-ATTENTION FOR VIDEO PROCESSING

(71) Applicant: QUALCOMM Incorporated, San Diego, CA (US)

(72) Inventors: Davide Abati, Amsterdam (NL); Amirhossein Habibian, Amsterdam (NL); Amir Ghodrati, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 260 days.

(21) Appl. No.: 17/696,797

(22) Filed: Mar. 16, 2022

(65) Prior Publication Data

US 2022/0301311 A1 Sep. 22, 2022

Related U.S. Application Data

(60) Provisional application No. 63/162,478, filed on Mar. 17, 2021.

(51) Int. Cl.
| | |
|---|---|
| G06V 20/40 | (2022.01) |
| G06T 3/40 | (2024.01) |
| G06V 10/74 | (2022.01) |
| G06V 10/82 | (2022.01) |

(52) U.S. Cl.
CPC .......... *G06V 20/46* (2022.01); *G06T 3/40* (2013.01); *G06V 10/761* (2022.01); *G06V 10/82* (2022.01); *G06V 20/48* (2022.01)

(58) Field of Classification Search
CPC ...... G06V 20/46; G06V 10/761; G06V 10/82; G06V 20/48; G06T 3/40
See application file for complete search history.

(56) References Cited

U.S. PATENT DOCUMENTS

| | | | |
|---|---|---|---|
| 9,953,437 B1 * | 4/2018 | Kim | G06T 9/002 |
| 10,701,394 B1 * | 6/2020 | Caballero | G06N 3/045 |

FOREIGN PATENT DOCUMENTS

CN 111091125 A 5/2020

OTHER PUBLICATIONS

Fuoli D., et al., "Efficient Video Super-Resolution through Recurrent Latent Space Propagation", arXiv: 1909.08080v1 [eess.IV] Sep. 17, 2019, 10 Pages.
Sajjadi M., et al.,"Frame-Recurrent Video Super-Resolution", arXiv: 1801.04590v4 [cs.CV] Mar. 25, 2018, 9 Pages.

(Continued)

*Primary Examiner* — Pinalben Patel
(74) *Attorney, Agent, or Firm* — Seyfarth Shaw LLP

(57) ABSTRACT

A processor-implemented method for processing a video includes receiving the video as an input at an artificial neural network (ANN). The video includes a sequence of frames. A set of features of a current frame of the video and a prior frame of the video are extracted. The set of features including a set of support features for a set of pixels of the prior frame to be aligned with a set of reference features of the current frame. A similarity between a support feature for each pixel in the set of pixels of the set of support features of the prior frame and a corresponding reference feature of the current frame is computed. An attention map is generated based on the similarity. An output including a reconstruction of the current frame is generated based on the attention map.

24 Claims, 10 Drawing Sheets

(56) References Cited

OTHER PUBLICATIONS

Wang X., et al., "EDVR: Video Restoration with Enhanced Deformable Convolutional Networks", arXiv: 1905.02716v1 [cs.CV] May 7, 2019, pp. 1-10.
International Search Report and Written Opinion—PCT/US2022/020801—ISA/EPO—Jul. 4, 2022.
Zhang R., et al., "Aggregating Motion and Attention for Video Object Detection", Feb. 23, 2020 (Feb. 23, 2020), Computer Vision—ECCV 2020: 16th European Conference, Glasgow, UK, Aug. 23-28, 2020: Proceedings, [Lecture Notes in Computer Science, ISSN 0302-9743], Springer International Publishing, CHAM, pp. 601-610, ISBN: 978-3-030-58594-5 [Retrieved on Feb. 23, 2020].
Yu Y., et al., "Split-Attention Multiframe Alignment Network for Image Restoration", IEEE Access, IEEE, USA, vol. 8, Jan. 17, 2020, pp. 39254-39272.

\* cited by examiner

EFFICIENT SELF-ATTENTION FOR VIDEO PROCESSING

CROSS-REFERENCE TO RELATED APPLICATION

The present application claims the benefit of U.S. Provisional Patent Application No. 63/162,478, filed on Mar. 17, 2021, and titled "EFFICIENT SELF-ATTENTION FOR VIDEO PROCESSING," the disclosure of which is expressly incorporated by reference in its entirety.

BACKGROUND

Field

Aspects of the present disclosure generally relate to neural networks, and more particularly, to video processing using self-attention.

Background

Artificial neural networks may comprise interconnected groups of artificial neurons (e.g., neuron models). The artificial neural network may be a computational device or represented as a method to be performed by a computational device.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Convolutional neural networks are a type of feed-forward artificial neural network. Convolutional neural networks may include collections of neurons that each have a receptive field and that collectively tile an input space. Convolutional neural networks (CNNs) such as deep convolutional neural networks (DCNs) have numerous applications. In particular, these neural network architectures are used in various technologies, such as image recognition, pattern recognition, speech recognition, autonomous driving, video processing and other classification tasks.

Video processing involves acquiring information from neighboring frames. The temporal information gained from the neighboring frames may benefit video frame reconstruction quality, but it comes at the cost of significant computational overhead. The challenges presented via the increased computational overhead are further exacerbated in resource-limited devices, such as smartphones and other mobile devices.

SUMMARY

The present disclosure is set forth in the independent claims, respectively. Some aspects of the disclosure are described in the dependent claims.

In one aspect of the present disclosure, a processor-implemented method for processing a video is presented. The processor-implemented method includes receiving the video as an input at an artificial neural network (ANN), the video comprising a sequence of frames. The processor-implemented also includes extracting a set of features of each of a current frame of the video and a prior frame of the video. The set of features includes a set of support features for a set of pixels of the current frame to be aligned with a set of reference features of the current frame. The processor-implemented additionally includes computing a similarity between a support feature for each pixel in the set of pixels of the set of support features of the prior frame and a corresponding reference feature of the current frame. The processor-implemented further includes generating an attention map based on the similarity. The method also includes generating an output comprising a reconstruction of the current frame based on the attention map.

Another aspect of the present disclosure is directed to an apparatus for processing a video. The apparatus includes means for receiving the video as an input at an artificial neural network (ANN). The video includes a sequence of frames. The apparatus also includes means for extracting a set of features of each of a current frame of the video and a prior frame of the video. The set of features includes a set of support features for a set of pixels of the current frame to be aligned with a set of reference features of the current frame. The apparatus additionally includes means for computing a similarity between a support feature for each pixel in the set of pixels of the set of support features of the prior frame and a corresponding reference feature of the current frame. The apparatus further includes means for generating an attention map based on the similarity. The apparatus also includes means for generating an output comprising a reconstruction of the current frame based on the attention map.

In another aspect of the present disclosure, a non-transitory computer-readable medium with non-transitory program code for processing a video recorded thereon is disclosed. The program code is executed by a processor and includes program code to receive the video as an input at an artificial neural network (ANN). The video includes a sequence of frames. The program code also includes program code to extract a set of features of each of a current frame of the video and a prior frame of the video. The set of features includes a set of support features for a set of pixels of the current frame to be aligned with a set of reference features of the current frame. The program code additionally includes program code to compute a similarity between a support feature for each pixel in the set of pixels of the set of support features of the prior frame and a corresponding reference feature of the current frame. The program code further includes program code to generate an attention map based on the similarity. The program code also includes program code to generate an output comprising a reconstruction of the current frame based on the attention map.

Another aspect of the present disclosure is directed to an apparatus for processing a video. The apparatus has a memory and one or more processors coupled to the memory. The processor(s) is configured to receive the video as an input at an artificial neural network (ANN). The video includes a sequence of frames. The processor(s) is also configured to extract a set of features of each of a current frame of the video and a prior frame of the video. The set of features includes a set of support features for a set of pixels of the current frame to be aligned with a set of reference features of the current frame. The processor(s) is additionally configured to compute a similarity between a support feature for each pixel in the set of pixels of the set of support features of the prior frame and a corresponding reference feature of the current frame. The processor(s) is further configured to generate an attention map based on the similarity. Furthermore, the processor(s) is configured to generate an output comprising a reconstruction of the current frame based on the attention map.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
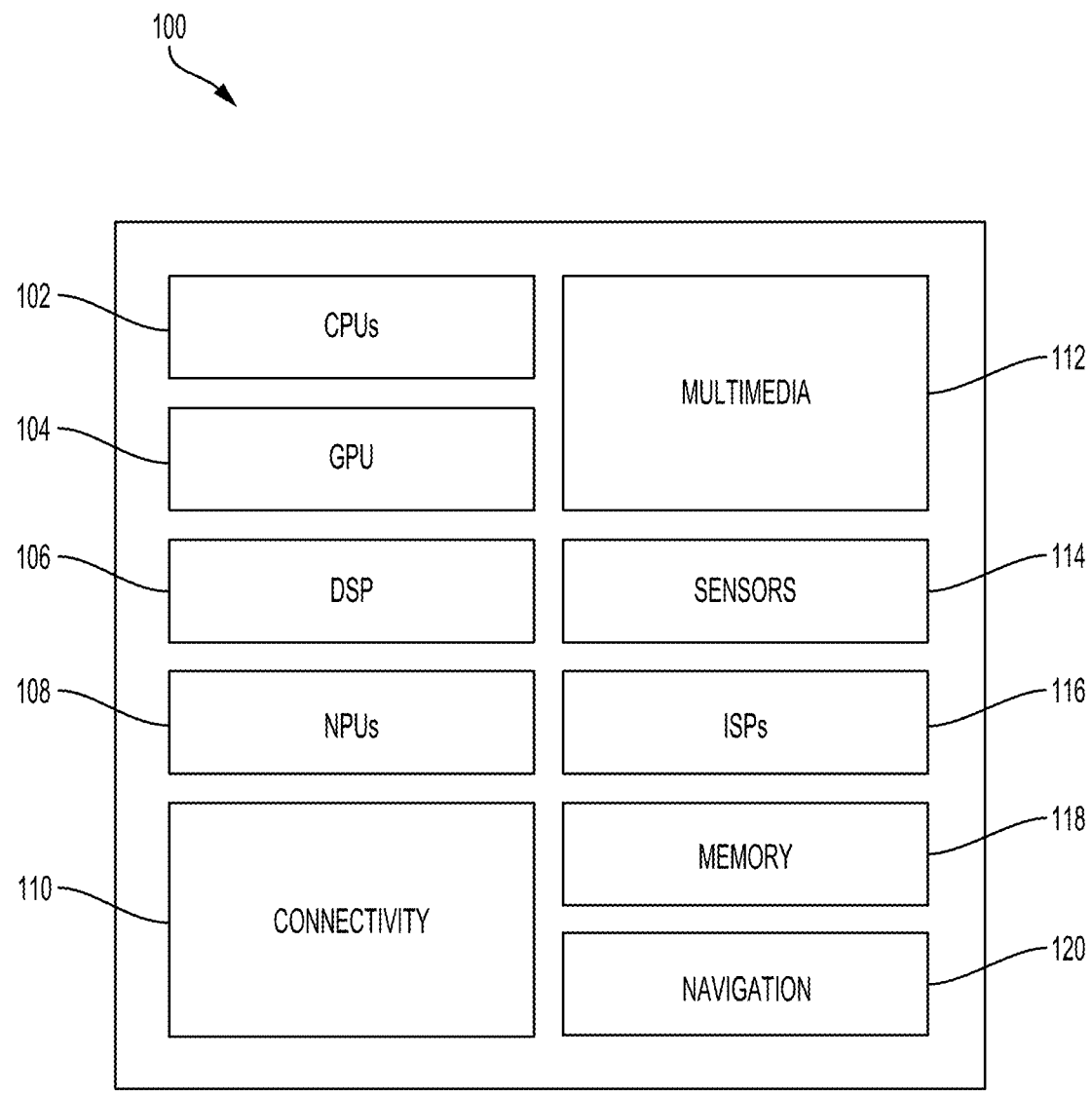
FIG. 1 illustrates an example implementation of a system-on-a-chip (SoC), including a central processing unit (CPU), in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks can be used to solve complex problems. However, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Convolutional neural networks (CNNs), such as deep convolutional neural networks (DCNs), have numerous applications. In particular, these neural network architectures are used in various technologies, including video processing, for instance.

Video processing involves acquiring information from neighboring frames. In the presence of misalignment (e.g., due to local or global motion), convolutional kernels may struggle to take advantage of temporal information. Conventional approaches rely on expansive operators leading to significant computational costs, delay, and energy consumption.

To address these and other challenges, aspects of the present disclosure are directed to an attention-based alignment model. The attention-based alignment model leverages the locality of motion among neighboring support frames. In accordance with aspects of the present disclosure, as pixels undergo displacements between consecutive frames, an attended context may be limited to a local spatial neighborhood. Additionally, because pixels may not undergo the same amount of displacement from one frame to the next, alignment operations may be limited to regions that undergo significant change under the control of a gating module. The gating module may learn a binary function over pixels indicating where alignment may be skipped based on the input.

Moreover, aspects of the present disclosure are broadly applicable in the area of video processing, including, but not limited to, video-to-video processing. For instance, aspects of the present disclosure may be applied to improve super resolution in video (e.g., smartphone sensors) as well as other video enhancements such as alignment of frames, motion compensation denoising, deblocking, deblurring, and stabilization in video.

FIG. 1 illustrates an example implementation of a system-on-a-chip (SoC) 100, which may include a central processing unit (CPU) 102 or a multi-core CPU configured for video processing using an artificial neural network (e.g., a neural end-to-end network). Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a global positioning system.

The SoC 100 may be based on an ARM instruction set. In an aspect of the present disclosure, the instructions loaded into the general-purpose processor 102 may include code to receive a video as an input at an artificial neural network (ANN). The video comprises a sequence of frames. The general-purpose processor 102 may also include code to extract a set of features of a current frame of the video and a prior frame of the video. The set of features includes a set of support features for a set of pixels of the prior frame to be aligned with a set of reference features of the current frame. The general-purpose processor 102 may additionally include code to compute a similarity between a support feature for each pixel in the set of pixels of the set of support features of the prior frame and a corresponding reference feature of the current frame. The general-purpose processor 102 may also include code to generate an attention map based on the similarity. Furthermore, the general-purpose processor 102 may include code to generate an output comprising a reconstruction of the current frame based on the attention map.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
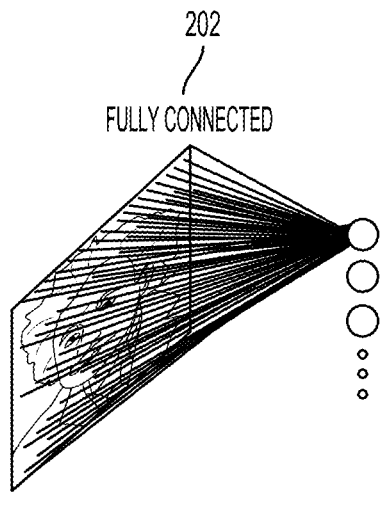
FIGS. 2A, 2B, and 2C are diagrams illustrating a neural network, in accordance with aspects of the present disclosure.
Figure 2B:
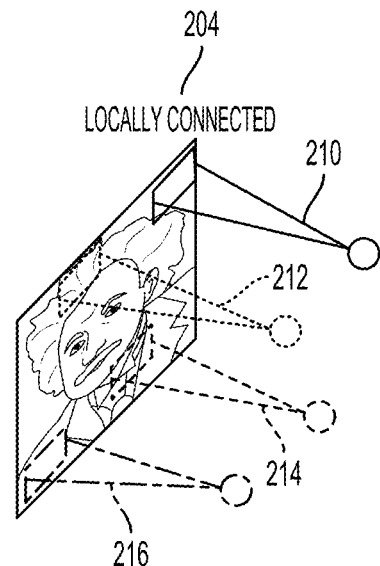

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
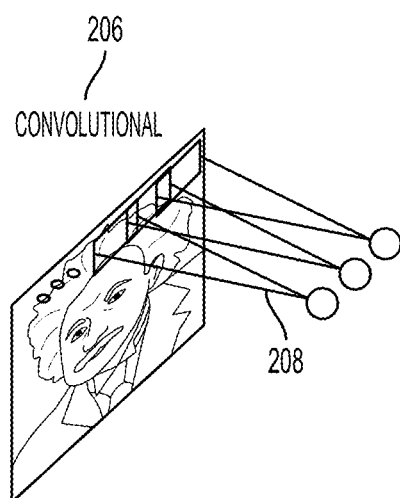

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
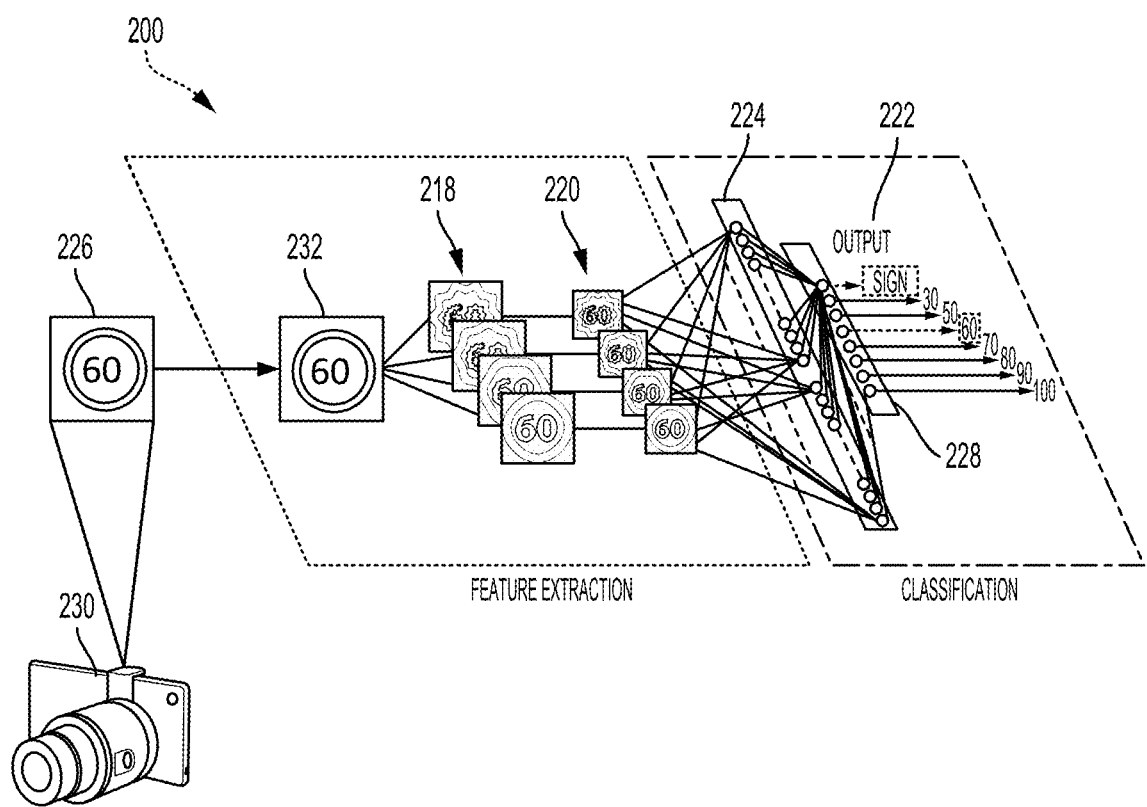
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down-sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
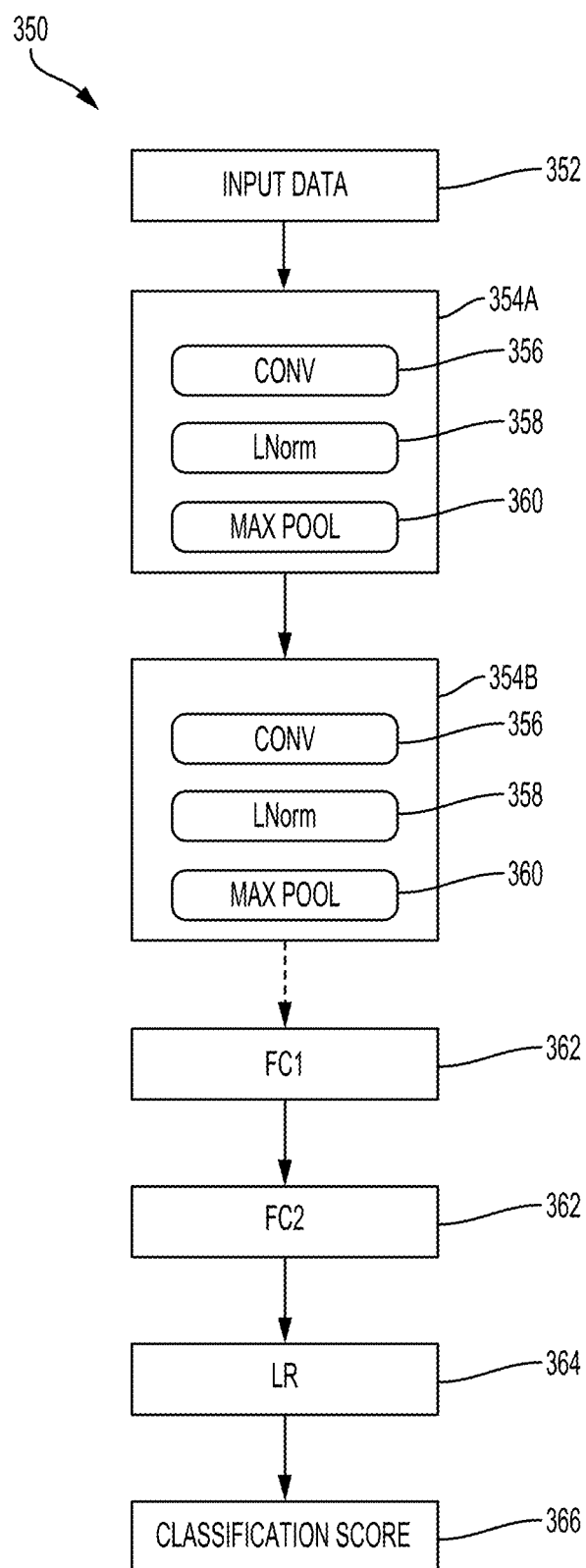
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down-sampling aggregation over space for local invariance and dimensionality reduction.

The parallel filter banks, for example, of a deep convolutional network may be loaded on a CPU 102 or GPU 104 of an SoC 100 to achieve high performance and low power consumption. In alternative embodiments, the parallel filter banks may be loaded on the DSP 106 or an ISP 116 of an SoC 100. In addition, the deep convolutional network 350 may access other processing blocks that may be present on the SoC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
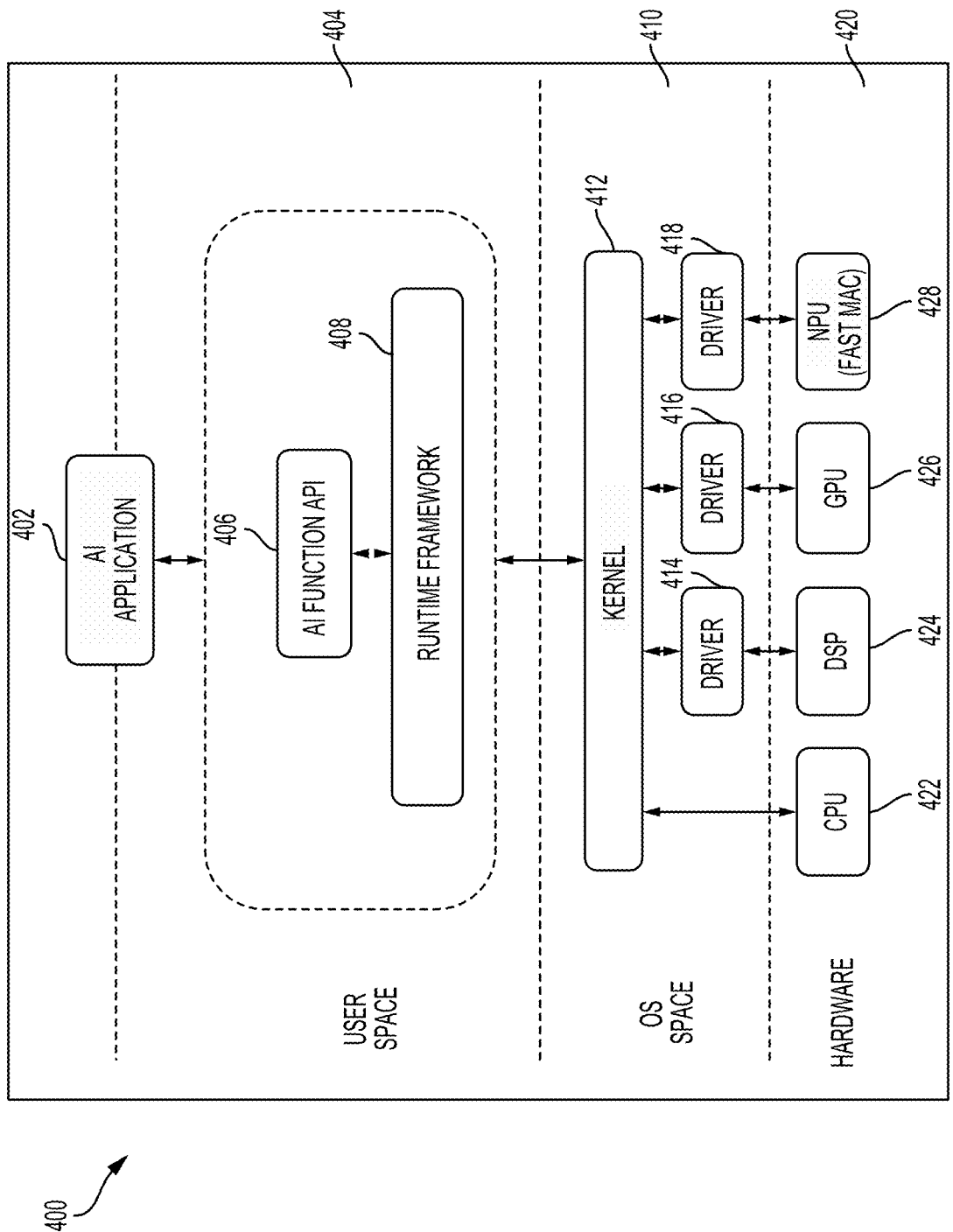
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture, applications may be designed that may cause various processing blocks of a system-on-a-chip (SoC) 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space, such as a Kernel 412, running on the SoC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Kernel 412, running on the SoC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

Figure 5:
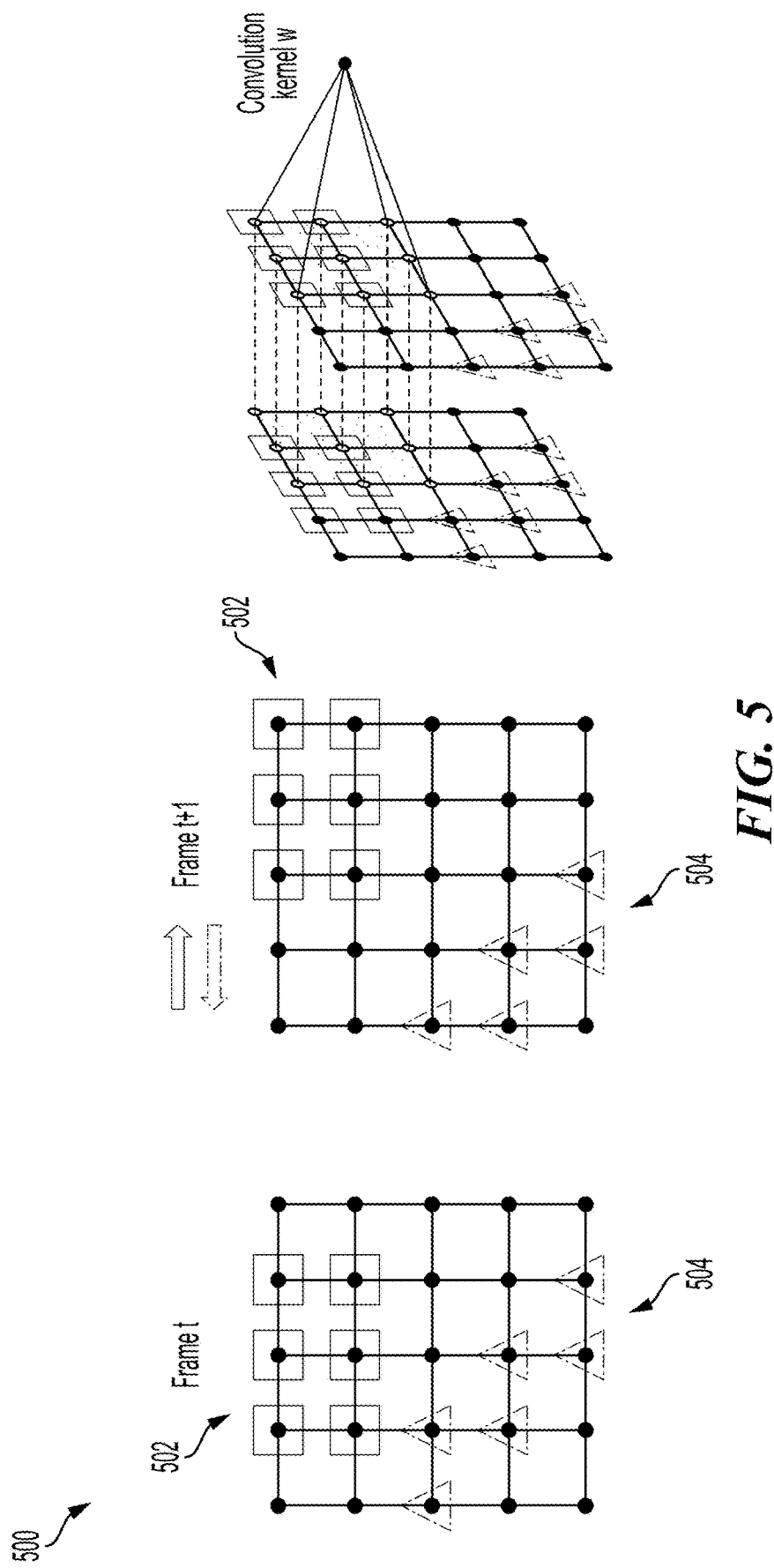
FIG. 5 is a block diagram illustrating example frames of a video for processing, in accordance with aspects of the present disclosure.

FIG. 5 is a diagram illustrating example frames of a video 500 for processing, in accordance with aspects of the present disclosure. Referring to FIG. 5, a pair of sequential frames (e.g., t and t+1) of a video 500 are shown. Frames t and t+1 each include a grid of pixels. Multiple separate objects 502, 504 are represented in the frames. For instance, object 502 is represented by squares and object 504 is represented by triangles. Each of the objects 502, 504 are independently in motion as represented by shifting the squares for object 504 and the triangles for object 504 to different sets of pixels which are illuminated for each object from frame t to the subsequent time step (t+1). That is, the shift in pixels for object 502 may be different than the shift in pixels for object 504. Conventional convolution kernels (e.g., w) are unable to efficiently model multiple independent motions.

To address the scenario depicted in the frames t and t+1 of the video, aspects of the present disclosure are directed to video processing using self-attention. Self-attention is used to align frames (e.g., t and t+1) in a video. Attention may be considered as the focusing or weighting of one portion of an input, such as a sequence or an image more heavily than other areas. In the context of an image, attention may focus on certain regions with high-resolution while the other areas, such as a background, may be observed in low-resolution. Aspects of the present disclosure leverage spatial and temporal redundancies in video to improve processing efficiency.

In accordance with aspects of the present disclosure, an alignment operator based on self-attention among pixels is provided. The alignment operator may be defined as a function of three input tensors, $t_{sup}$, $u_{ref}$, and $u_{sup}$ that may represent features extracted from frames of the video. The unaligned features tensor $t_{sup}$ represents the frame or features to be aligned. The reference feature tensor $u_{ref}$ represents the frame or features to be used for a reference coordinate system for alignment. The support feature tensor $u_{sup}$ represents support features spatially arranged for use in estimating motion with respect to the reference feature tensor $u_{ref}$. The input tensors may be associated with queries ($q_{ref}$), keys ($k_{sup}$), and values ($v_{sup}$) embeddings for self-attention as follows:

$$q_{ref} = \phi_q(u_{ref}) \quad q_{ref} \in \mathbb{R}^{hw \times 1 \times d_k}$$

$$k_{sup} = \phi_k(u_{sup}) \quad k_{sup} \in \mathbb{R}^{hw \times k_h k_w \times d_k}$$

$$v_{sup} = \phi_v(t_{sup}) \quad v_{sup} \in \mathbb{R}^{hw \times k_h k_w \times d_v} \quad (1)$$

where each $\phi$ represents a pixel-wise projection function parameterized separately for q, k, and v, followed by reshaping, $d_k$ and $d_v$ identify the dimensionality of keys and values, $k_h$ and $k_w$ represent the height and width of a local window centered on each query, and h and w are the height and width of the feature tensor (e.g., $u_{ref}$, $u_{sup}$, and $t_{sup}$), respectively.

Each reference pixel in the reference feature tensor $u_{ref}$ is linearly embedded in a query vector $q_{ref}$. The support feature tensor $u_{sup}$ exposes the window of keys $k_{sup}$ centered in each query in $q_{ref}$. Each query for a pixel is subjected to a local search of the window of keys, which may define a neighborhood for corresponding pixel in the support frame $u_{sup}$. Each query may be matched by the dot product with each of the keys of its window to provide a similarity based search inside the keys. The similarities may be normalized by applying a softmax operation to produce an attention mask or alignment operator. In other words, the alignment operator (may also be referred to as warping operator) aligns the unaligned feature tensor $t_{sup}$ to reference feature tensor $u_{ref}$ by estimating the warp between the support feature tensor $u_{sup}$ and the reference feature tensor $u_{ref}$. The alignment operator may be defined as:

$$\hat{v}_{sup} = \sigma(k_{sup}^T q_{ref}) v_{sup}, \quad (2)$$

where $\sigma$ indicates a softmax normalization.

The alignment operator may include a motion estimation portion given by the softmax operation (e.g., $\sigma(k_{sup}^T q_{ref})$). The motion estimation may be in the form of a dense hw×hw matrix that includes elements that are pairwise similarities between all of the reference queries $q_{ref}$ and support keys $k_{sup}$. As such, the alignment operator $\hat{v}_{sup}$ may operate over the whole spatial extent of the frame and thus may allocate the same amount of computation to every pixel. The alignment operator $\hat{V}_{sup}$ may inform about the spatial displacement between the reference features (e.g., $u_{ref}$) and support features (e.g., $u_{sup}$ and $t_{sup}$) and provides an aligned feature map $\hat{v}_{sup} \in \mathbb{R}^{hw \times d_v}$. Thus, the alignment operator may transform the support values $v_{sup}$ according to the motion estimation (e.g., $\sigma(k_{sup}^T q_{ref})$).

In some aspects, the query selection may be for one or more portions of the window rather than the whole spatial extent. The query may be dynamically selected based on the input. A parametric binary function g may determine, for each pixel, whether to perform self-attention motion compensation or to directly utilize contextual information without alignment as follows:

$$m = g(\|u_{ref} - u_{sup}\|_1), m \in \{0,1\}^{hw}$$

$$\hat{v}_{sup} = m \odot \sigma(k_{sup}^T q_{ref}) v_{sup} + (1-m) \odot v_{sup}, \quad (3)$$

where m is the mask, g is the gate function and $\odot$ is the Hadamard product operator.

Figure 6:
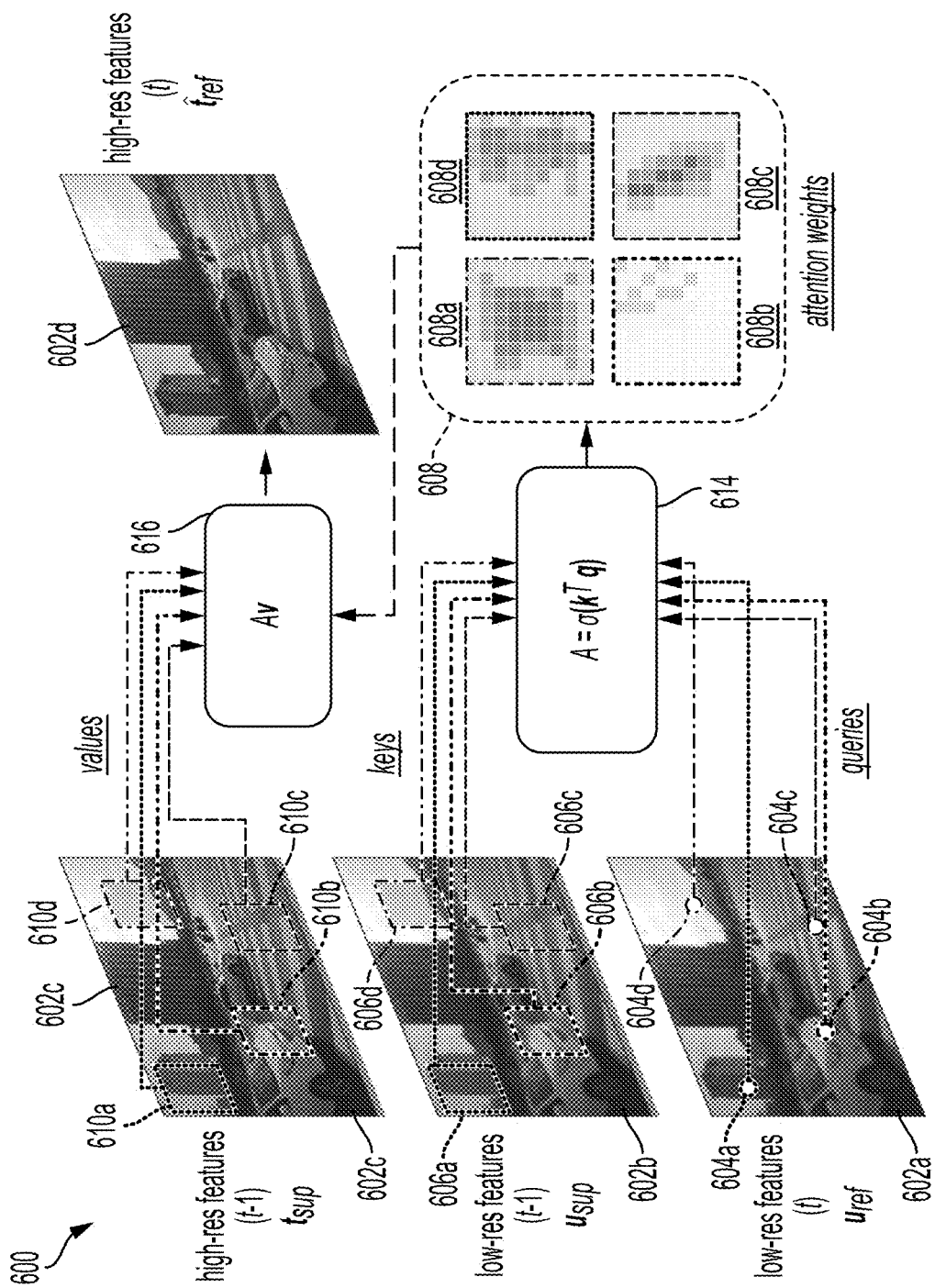
FIG. 6 is a block diagram illustrating an example alignment of frames using self-attention, in accordance with aspects of the present disclosure.

FIG. 6 is a diagram illustrating an example alignment of a sequence of frames 600 using self-attention, in accordance with aspects of the present disclosure. Referring to FIG. 6, a reference frame 602a and a support frame 602b are shown. The reference frame 602a may be low-resolution features of a current frame time t. The support frame 602b may be low-resolution features of a prior frame at time t-1. The reference frame 602a and the support frame 602b may be supplied from an intermediate layer of a neural network, for example. An unaligned high-resolution frame 602c may have high-resolution features of the prior frame (t-1) processed at a subsequent layer of the neural network is also shown.

The alignment operator 616 may be used to estimate the motion between the prior frame (t-1) and the current frame (t). Attention weights 608a-608d may be generated using the attention function 614. The attention function 614, may apply a normalization function (e.g., softmax normalization) to the product of the keys and the queries. Each pixel 604a-604d of the reference frame 602a may represent a query in frame t (low-resolution features at time step t). Each query (e.g., 604a-604d) has a corresponding window of keys 606a-606d into the support frame 602b (e.g., prior frame at time step t−1). Each of the windows of keys 606a-606d may be considered as a neighborhood of pixels surrounding the corresponding pixel location of the query 604a-604d. The windows of keys 606a-606d may define a search space of pixels in the support frame 602b. As such, each query 604a-604d is subjected to a local search within the window of keys 606a-606d in the support frame 602b. That is, each pixel (e.g., query) 604a-604d of the reference frame 602a is compared to each of the pixels within the corresponding window of keys 606a-606d of the support frame 602b. For example, the similarity between the query of the reference frame 602a and every key in the respective window in the support frame 602b may be computed by taking the dot product of the query (e.g., 604a-604d) with every key in the respective window (e.g., 606a-606d).

As shown in FIG. 6, the similarities may be normalized to produce a set of attention weights 608a-608d which respectively correspond to the keys 606a-606d. The set of attention weight 608 608a-608d may represent an attention map 608. In turn, the attention weights 608a-608d, which may represent the attention map 608 may be applied to the respective values 610a-610d of the unaligned high-resolution frame 602c. The value 610a-610d may represent a weighted sum of the pixels corresponding respective window of keys (e.g., neighborhood of pixels) 606a-606d. The unaligned high-resolution frame 602c may be generated in a previous iteration and represent features of the neural network in the previous time step. Each of the weighted sums may be considered as values (e.g., 610a-610d) of the unaligned high-resolution frame 602c. A reconstructed video frame 602d with an improved alignment and having high-resolution features at time t may be generated according the alignment operator 616 based on the computed product of the values (e.g., 610a-610d) and the respective attention map 608a-608d. In some aspects the reconstructed video frame 602d may be output and displayed.

Figure 7A:
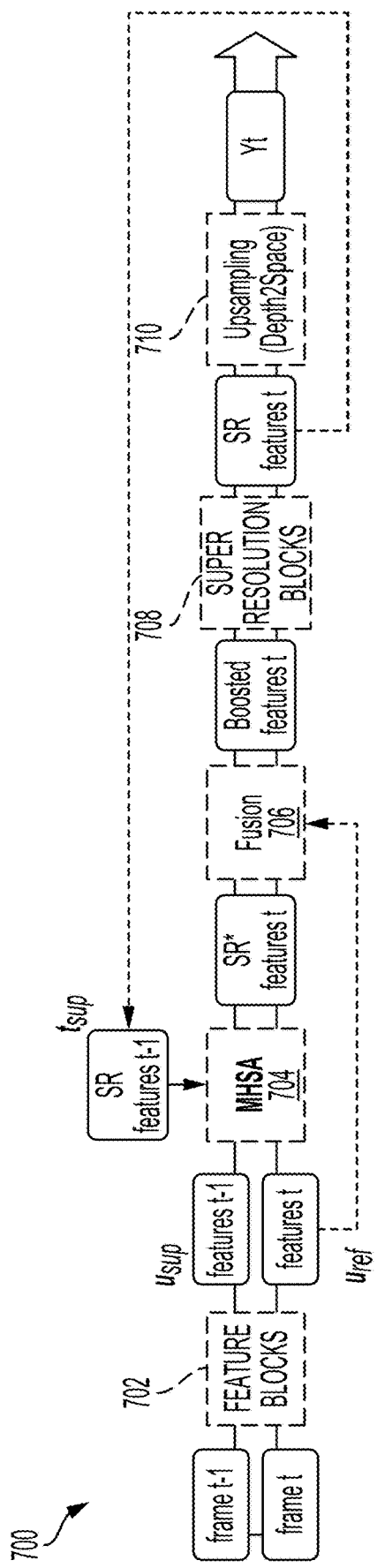
FIGS. 7A and 7B illustrate example architectures for aligning frames using self-attention, in accordance with aspects of the present disclosure.
Figure 7B:
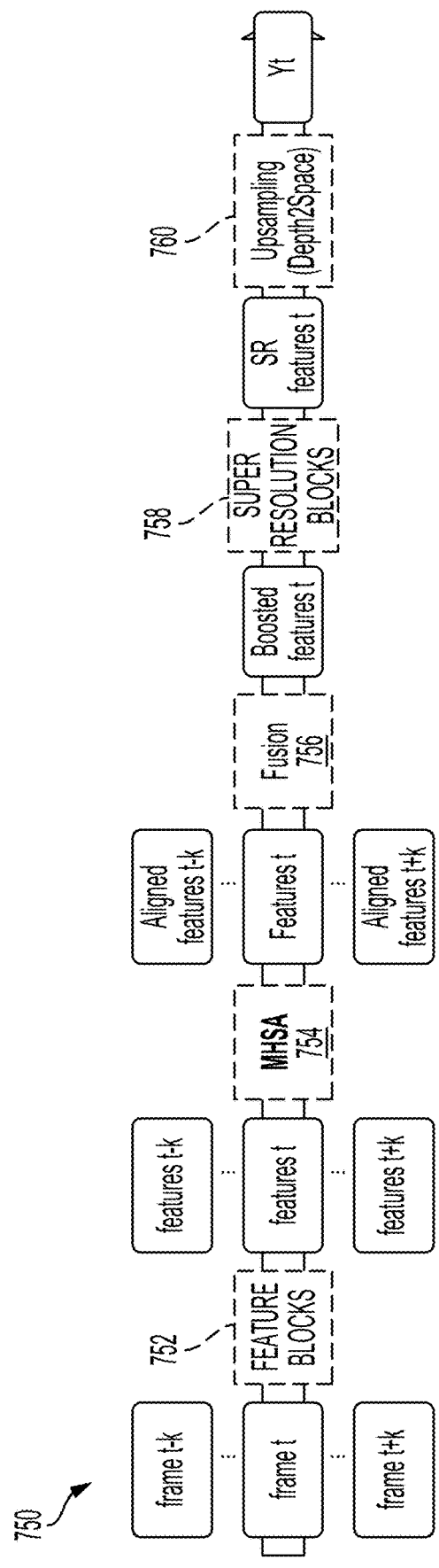

FIGS. 7A and 7B illustrate example architectures 700 and 750 for aligning frames using self-attention, in accordance with aspects of the present disclosure. Referring to FIG. 7A, the example architecture 700 is a recurrent neural network model. The example architecture 700 receives a video as input. A frame t and frame t−1 of the video are subjected to feature blocks 702. The feature blocks 702 may, for instance, include a set of convolutional layers (not shown), each of which may function in a manner similar to the convolution layer 356 shown in FIG. 3. The feature blocks 702 may process frame t and frame t−1 to produce respective features, features t−1 and features t. These intermediate level features (e.g., features produced via early layers of the feature block near the input) may compute queries ($u_{ref}$) and keys ($u_{sup}$). The action (or motion) information ($t_{sup}$) to be warped or aligned is from a prior time (t−1). The features t representing queries ($u_{ref}$) and the features t−1 representing keys ($u_{sup}$) are supplied to a multi-head self-attention block (MHSA) 704 along with the motion information ($t_{sup}$). The MHSA 704 may be a module for attention mechanisms that enable attending to different portions of the sequence independently. The MHSA 704 may produce a set of features for an aligned frame at time step t (e.g., high-resolution features t).

In this example architecture 700, further processing may be performed to provide super resolution. A fusion block 706 may receive the set of features for the aligned frame at time t. The fusion block 706 may process the aligned frame at time t and the result of the alignment of the tensor $t_{sup}$ and may fuse them into a single tensor. For example, the fusion block 706 may perform a channel-wise concatenation and 1×1 convolution to generate boosted features t. The boosted features t may be supplied to a super resolution block 708. The super resolution block 708 may process the boosted features t through a set of convolutional blocks that may, for example, further refine the output of fusion block 706 to compute higher resolution features (e.g., super resolution features). The higher resolution features may be up-sampled via an up-sampling block 710, which performs a spatial up-sampling via subpixel convolutions to recover the output.

Referring to FIG. 7B, the example architecture 750 provides a multi-frame implementation. In the example architecture 750, a set of window or frames is supplied as inputs frame (t−k) to frame (t+k). To up-sample frame t, the window of frames and the tensors represented by the features extracted from each window may be warped to be aligned to the frame t. Feature blocks 752 process each input of the set of windows to generate corresponding features. The features from frames t−k to t+k other than frame t are aligned to the features at frame t via a MHSA 754. In this example architecture, the support information (e.g., features t−k to features t+k) may be computed by directly feeding into the network past and future frames in a temporal window (e.g., 3 frames in the past and in the future). This may result in a set of 2k−1 aligned features (e.g., aligned features t−k to aligned features t+k). The fusion block 756 may then fuse the 2k−1 features with the features at t via a channel-wise concatenation and 1×1 convolution to generate boosted features t. Thereafter, the example architecture 750 may function in a manner similar to that of the example architecture 700 of FIG. 7A. That is, the boosted features t are supplied to a super resolution block 758. In turn, the super resolution block 758 may process the boosted features t through a set of convolutional blocks that further refine the output of the fusion block 756 to compute higher resolution features (e.g., super resolution features). The higher resolution features are up-sampled via an up-sampling block 760, which performs a spatial up-sampling via subpixel convolutions to recover the output.

Figure 8:
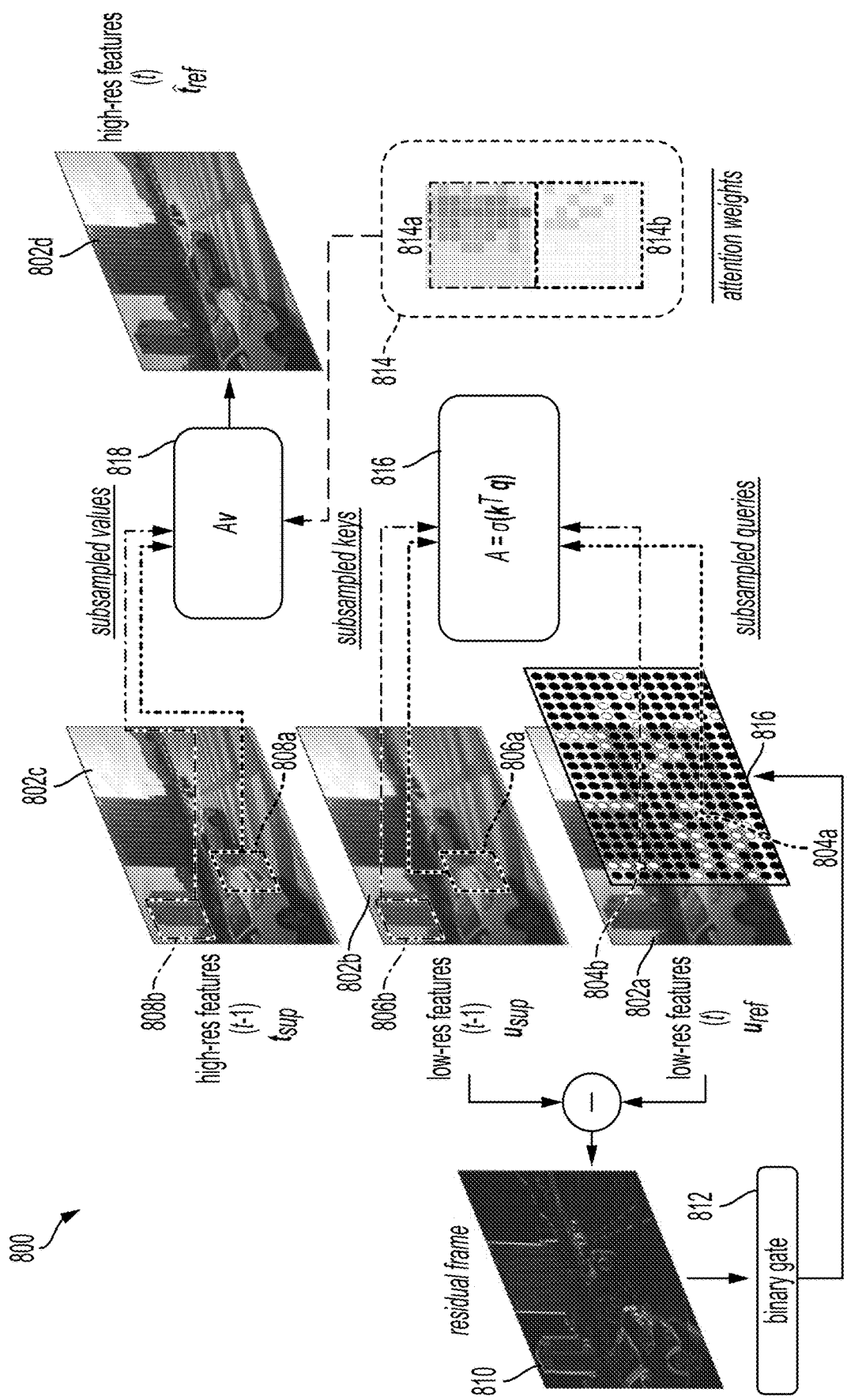
FIG. 8 is a diagram illustrating an example alignment of frames using query selection, in accordance with aspects of the present disclosure.

FIG. 8 is a diagram illustrating an example alignment of frames 800 using query selection, in accordance with aspects of the present disclosure. As described, aspects of the present disclosure may provide increased processing efficiency. Rather than aligning every pixel in the frames, similarities between sequential frames of a video may be further used to reduce the alignment operations performed to the align the sequential frames. That is, as pixels may undergo small displacements between sequential frames, a gating function may be applied to limit the alignment operation to regions with significant change. The change or difference between frames may be represented by a residual frame, for example. Having computed the residual frame, a gating function may be applied to determine whether or not to perform alignment operations (e.g., similar to the alignment operations of FIG. 6).

Referring to FIG. 8, a binary gate 812 may limit alignment of frames t (e.g., 802a) and t−1 (e.g., 802b) such that the alignment may be conditional based on the input. This may be beneficial, for example, where there is limited camera motion or moving objects between frames t and t−1. In such cases, many of the pixels may not be involved in the motion between the frames, and thus may already be aligned. Accordingly, rather than performing an alignment for every pixel in the frame t (e.g., 802a), the binary gate 812 may determine a subset of pixels in the frame t 802a to align.

In the example of FIG. 8, low-resolution features of a reference frame 802a at time step t and a support frame 802b at time step t−1 are shown. High-resolution features of an unaligned frame 802c at time t−1 are also shown. A residual frame 810 may be computed as the difference between the $u_{sup}$ tensors of the support frame 802b and the $u_{ref}$ tensors of the reference frame 802a. The residual frame 810 may act as a bias toward the regions in the frames that are to be aligned. Regions that have a high residual are more likely misaligned and regions that have low residuals may already be aligned. In one example, a region may have a high residual if it includes a moving object, such as a car moving in a street, for instance. In this example, features of the car and street pixels may be different, such that if a pixel transitions from one frame to another frame (due to motion), then the regions including such pixels may have a high residual. The high residual may indicate that motion is likely, and therefore alignment may be performed. The relative magnitude of residual may be dependent on factors including the network architecture and the scale of the input images, for example. In some examples, a residual value>1 may be considered a high residual value. On the other hand, a residual value≤0.001 may be considered a low residual value.

The residual frame 810 may be supplied to the binary gate 812. The binary gate may be a one-layer convolution with a single output, for example. In some aspects, a softmax (e.g., a Gumbel softmax) operation may be applied along with a straight through estimator for training the binary gate. In a forward pass, an argmax function may be applied with a probability p for making hard attention (z∈{0,1}), but a gradient may be relaxed using a softmax function in place of the argmax function such that a sample may be expressed by a vector $\hat{X}$ as follows: $\hat{X}_k$=softmax((log $\alpha_k$+$G_k$)/τ), where $\hat{X}_k$ is the $k^{th}$ element in $\hat{X}$, $\alpha_k$ is the unnormalized probability, $G_k$ is a sequence of independent and identically distributed random variables (e.g., noise), and τ is a temperature parameter of the softmax function.

Accordingly, the binary gate 812 may limit the alignment to the active pixels (shown as the white pixels in the pixel view 816). That is, the binary gate 812 provides a binary value for each pixel of the reference frame to be ON or OFF based on the computed residual frame 810. If the pixels are active or ON, then alignment may be performed. On the other hand if the pixels are inactive or OFF, then an alignment may not be performed. In some aspects, if the pixels are inactive or OFF, the pixel values of the support frame 802b corresponding to the inactive pixels of reference frame 802a may be copied without processing.

Having limited the pixels for alignment, the self-attention process may be conducted as discussed above with reference to FIG. 6, to generate the reconstructed frame (e.g., high-resolution features of the frame) at time t.

Each active pixel 804a, 804b of the reference frame 802a (shown via pixel view 816) may represent a query into the support frame 802b. Each query (e.g., 804a, 804b) has a corresponding window of keys 806a, 806b into the support frame 802b (e.g., prior frame at time step t−1). Each of the windows of keys 806a, 806b may define a search space of pixels in the support frame 802b. As such, each query 804a, 804b may be subjected to a local search within the window of keys 806a, 806b in the support frame 802b. That is, the active pixels (e.g., 804a, 804b) of the reference frame 802a are compared to each of the pixels within the corresponding window of keys (806a, 806b) of the support frame 802b. For example, the similarity between the queries (e.g., 804a, 804b) of the reference frame 802a and every key in the respective window 806a, 806b in the support frame 802b may be computed by taking the dot product of the query (e.g., 804a, 804b) with every key in the respective window (e.g., 806a, 806b). The similarities may be normalized to produce a set of corresponding attention weights 814a, 814b according to an attention function 816. The attention weights 814a, 814b may collectively represent an attention map 814.

In turn, the attention weights 814a, 814b may be applied to the values (e.g., 808a, 808b) of unaligned high-resolution frame 802c. The values 808a, 808b may be a weighted sum of each set of pixels of the unaligned high-resolution frame 802c respectively corresponding to the window of keys 806a, 806b of the low resolution features of the support frame 802b. That is, each of the weighted sums may be considered as values (e.g., 808a, 808b) of unaligned high-resolution frame 802c. A reconstructed video frame 802d at time t may be generated with an improved alignment determined according to alignment operator 818. The reconstructed video frame 802d may be generated based on the computed product of the attention weights 814a, 814b and the corresponding values (e.g., 808a, 808b) subject to the selection of queries representing active pixels. The reconstructed video 802d may also have high-resolution features.

In some aspects the reconstructed video frame 802d may be output and displayed.

In some aspects, a sparsity loss objective may be applied to further limit the pixels to be aligned. The sparsity objective may be expressed as:

$$\mathcal{L}_{spars} = \beta \times \|g(u_{ref}, u_{sup})\|_1 \qquad (4)$$

where β is a hyper parameter for controlling the tradeoff between efficiency and quality of the reconstruction by further limiting the amount of pixels to be aligned.

Figure 9:
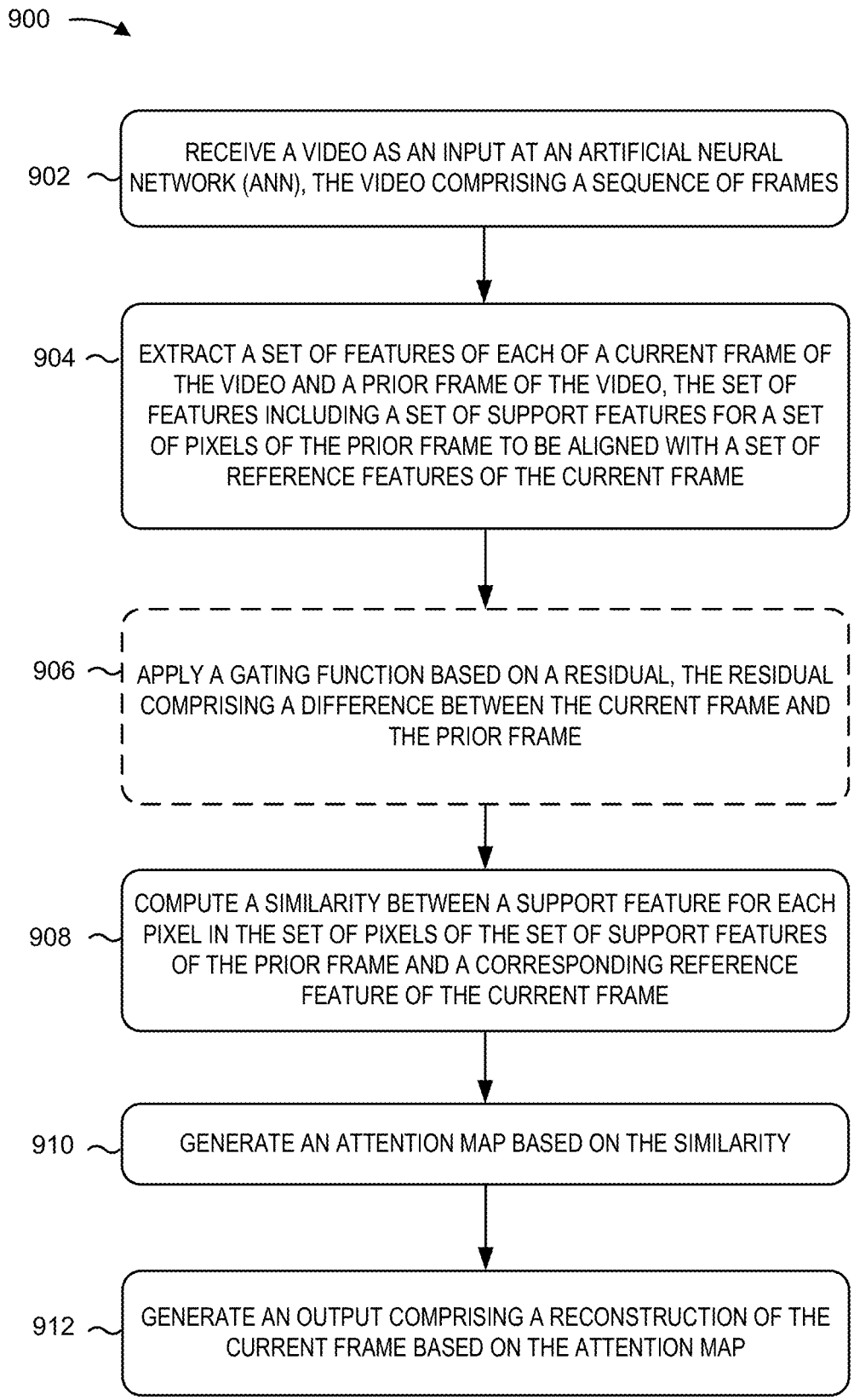
FIG. 9 is a flow diagram illustrating a method for processing a video, in accordance with aspects of the present disclosure.

FIG. 9 is a flow diagram illustrating a method 900 for processing a video, in accordance with aspects of the present disclosure. As shown in FIG. 9, at block 902, the method 900 receives a video as an input at an artificial neural network (ANN). The video comprises a sequence of frames. For instance, as shown in FIG. 7A, the example architecture 700 receives a video including a frame at time t−1 and a frame at time t.

At block 904, the method 900 extracts a set of features of each of a current frame of the video and a prior frame of the video. The set of features includes a set of support features for a set of pixels of the prior frame to be aligned with a set of reference features of the current frame. For example, three input tensors, $t_{sup}$, $u_{ref}$, and $u_{sup}$ that may represent features extracted from frames of the video (e.g., 500). The unaligned features tensor $t_{sup}$ represents the frame or features to be aligned. The reference feature tensor $u_{ref}$ represents the frame or features to be used for a reference coordinate system for alignment. The support feature tensor $u_{sup}$ represents support features spatially arranged for use in estimating motion with respect to the reference feature tensor $u_{ref}$.

At block 906, the method 900 may optionally apply a gating function based on a residual comprising a difference between the current frame and the prior frame. As described, for instance with reference to FIG. 8, A residual frame 810 may be computed as the difference between the $u_{sup}$ tensors of the support frame 802b and the $u_{ref}$ tensors of the reference frame 802a. The residual frame 810 may act as a bias toward the regions in the frames that are to be aligned. Regions that have a high residual are more likely misaligned and regions that have low residuals may already be aligned. In one example, a region may have a high residual if it includes a moving object, such as a car moving in a street, for instance. The residual frame 810 may be supplied to a binary gate 812. The binary gate may be a one-layer convolution with a single output, for example. the binary gate 812 may limit the alignment to the active pixels (shown as the white pixels in the pixel view 816). That is, the binary gate 812 provides a binary value for each pixel of the reference frame to be ON or OFF based on the computed residual frame 810. If the pixels are active or ON, then alignment may be performed. On the other hand if the pixels are inactive or OFF, then an alignment may not be performed. In some aspects, if the pixels are inactive or OFF, the pixel values of the support frame 802*b* corresponding to the inactive pixels of reference frame 802*a* may be copied without processing.

At block 908, the method 900 computes a similarity between a support feature for each pixel in the set of pixels of the set of support features of the prior frame and a corresponding reference feature of the current frame. As discussed with reference to FIG. 6, each pixel of the reference frame 602*a* is compared to each of the pixels within the corresponding window of keys 606*a*-606*d* of the support frame 602*b*. For example, the similarity between the query of the reference frame 602*a* and every key in the respective window in the support frame 602*b* may be computed by taking the dot product of the query (e.g., 604*a*-604*d*) with every key in the respective window (e.g., 606*a*-606*d*).

At block 908, the method 900 generates an attention map based on the similarity. As discussed with reference to FIG. 6, attention weights 608*a*-608*d* may be generated using the attention function 614. The attention function 614, may apply a normalization function (e.g., softmax normalization) to the product of the keys and the queries. Each pixel 604*a*-604*d* of the reference frame 602*a* may represent a query in frame t (low-resolution features at time step t). Each query (e.g., 604*a*-604*d*) has a corresponding window of keys 606*a*-606*d* into the support frame 602*b* (e.g., prior frame at time step t–1). Each of the windows of keys 606*a*-606*d* may be considered as a neighborhood of pixels surrounding the corresponding pixel location of the query 604*a*-604*d*. The windows of keys 606*a*-606*d* may define a search space of pixels in the support frame 602*b*. As such, each query 604*a*-604*d* is subjected to a local search within the window of keys 606*a*-606*d* in the support frame 602*b*. That is, each pixel (e.g., query) 604*a*-604*d* of the reference frame 602*a* is compared to each of the pixels within the corresponding window of keys 606*a*-606*d* of the support frame 602*b*. For example, the similarity between the query of the reference frame 602*a* and every key in the respective window in the support frame 602*b* may be computed by taking the dot product of the query (e.g., 604*a*-604*d*) with every key in the respective window (e.g., 606*a*-606*d*). As shown in FIG. 6, the similarities may be normalized to produce a set of attention weights 608*a*-608*d* which respectively correspond to the keys 606*a*-606*d*. The set of attention weight 608 608*a*-608*d* may represent an attention map 608.

At block 910, the method 900 generating an output comprising a reconstruction of the current frame based on the attention map. As discussed, for example, with reference to FIG. 6, the attention weights 608*a*-608*d*, which may represent the attention map 608 may be applied to the respective values 610*a*-610*d* of the unaligned high-resolution frame 602*c*. The value 610*a*-610*d* may represent a weighted sum of the pixels corresponding respective window of keys (e.g., neighborhood of pixels) 606*a*-606*d*. The unaligned high-resolution frame 602*c* may be generated in a previous iteration and represent features of the neural network in the previous time step. Each of the weighted sums may be considered as values (e.g., 610*a*-610*d*) of the unaligned high-resolution frame 602*c*. A reconstructed video frame 602*d* with an improved alignment and having high-resolution features at time t may be generated according the alignment operator 616 based on the computed product of the values (e.g., 610*a*-610*d*) and the respective attention map 608*a*-608*d*.

Implementation examples are provided in the following numbered clauses:

1. A processor-implemented method for processing a video, comprising:
   receiving the video as an input at an artificial neural network (ANN), the video comprising a sequence of frames;
   extracting a set of features of each of a current frame of the video and a prior frame of the video, the set of features including a set of support features for a set of pixels of the current frame to be aligned with a set of reference features of the current frame;
   computing a similarity between a support feature for each pixel in the set of pixels of the set of support features of the prior frame and a corresponding reference feature of the current frame;
   generating an attention map based on the similarity; and
   generating an output comprising a reconstruction of the current frame based on the attention map.
2. The processor-implemented method of clause 1, further comprising displaying the output.
3. The processor-implemented method of clause 1 or 2, in which the reconstructed current frame includes an adjusted alignment of one or more pixels of the current frame.
4. The processor-implemented method of any of clauses 1-3, further comprising applying a gating function to limit computing the similarity to a subset of the set of pixels of the current frame based on a residual, the residual comprising a difference between the current frame and the prior frame.
5. The processor-implemented method of any of clauses 1-4, further comprising applying a sparsity objective to limit a number of pixels in the set of pixels of the current frame for which the similarity is computed.
6. The processor-implemented method of any of clauses 1-5, further comprising up-sampling the reconstructed current frame.
7. An apparatus for processing a video, comprising:
   a memory; and
   at least one processor coupled to the memory, the at least one processor configured:
     to receive the video as an input at an artificial neural network (ANN), the video comprising a sequence of frames;
     to extract a set of features of each of a current frame of the video and a prior frame of the video, the set of features including a set of support features for a set of pixels of the current frame to be aligned with a set of reference features of the current frame;
     to compute a similarity between a support feature for each pixel in the set of pixels of the set of support features of the prior frame and a corresponding reference feature of the current frame;
     to generate an attention map based on the similarity; and
     to generate an output comprising a reconstruction of the current frame based on the attention map.
8. The apparatus of clause 7, in which the at least one processor is further configured to display the output.

9. The apparatus of clause 7 or 8, in which the reconstructed current frame includes an adjusted alignment of one or more pixels of the current frame.
10. The apparatus of any of clauses 7-9, in which the at least one processor is further configured to applying a gating function to limit computing the similarity to a subset of the set of pixels of the current frame based on a residual, the residual comprising a difference between the current frame and the prior frame.
11. The apparatus of any of clauses 7-10, in which the at least one processor is further configured to apply a sparsity objective to limit a number of pixels in the set of pixels of the current frame for which the similarity is computed.
12. The apparatus of any of clauses 7-11, in which the at least one processor is further configured to up-sample the reconstructed current frame.
13. A non-transitory computer-readable medium having program code recorded thereon, the program code executed by a processor and comprising:
program code to receive the video as an input at an artificial neural network (ANN), the video comprising a sequence of frames;
program code to extract a set of features of each of a current frame of the video and a prior frame of the video, the set of features including a set of support features for a set of pixels of the current frame to be aligned with a set of reference features of the current frame;
program code to compute a similarity between a support feature for each pixel in the set of pixels of the set of support features of the prior frame and a corresponding reference feature of the current frame;
program code to generate an attention map based on the similarity; and
program code to generate an output comprising a reconstruction of the current frame based on the attention map.
14. The non-transitory computer-readable medium of clause 13, in which the program code further comprises program code to display the output.
15. The non-transitory computer-readable medium of clause 13 or 14, in which the reconstructed current frame includes an adjusted alignment of one or more pixels of the current frame.
16. The non-transitory computer-readable medium of any of clauses 13-15, in which the program code further comprises program code to apply a gating function to limit computing the similarity to a subset of the set of pixels of the current frame based on a residual, the residual comprising a difference between the current frame and the prior frame.
17. The non-transitory computer-readable medium of any of clauses 13-16, in which the program code further comprises program code to apply a sparsity objective to limit a number of pixels in the set of pixels of the current frame for which the similarity is computed.
18. The non-transitory computer-readable medium of any of clauses 13-17, in which the program code further comprises program code to up-sample the reconstructed current frame.
19. An apparatus for processing a video, comprising:
means for receiving the video as an input at an artificial neural network (ANN), the video comprising a sequence of frames;
means for extracting a set of features of each of a current frame of the video and a prior frame of the video, the set of features including a set of support features for a set of pixels of the current frame to be aligned with a set of reference features of the current frame;
means for computing a similarity between a support feature for each pixel in the set of pixels of the set of support features of the prior frame and a corresponding reference feature of the current frame;
means for generating an attention map based on the similarity; and
means for generating an output comprising a reconstruction of the current frame based on the attention map.
20. The apparatus of clause 19, further comprising means for further comprising displaying the output.
21. The apparatus of clause 19 or 20, in which the reconstructed current frame includes an adjusted alignment of one or more pixels of the current frame.
22. The apparatus of any of clauses 19-21, further comprising means for applying a gating function to limit computing the similarity to a subset of the set of pixels of the current frame based on a residual, the residual comprising a difference between the current frame and the prior frame.
23. The apparatus of any of clauses 19-22, further comprising means for applying a sparsity objective to limit a number of pixels in the set of pixels of the current frame for which the similarity is computed.
24. The apparatus of any of clauses 19-23, further comprising means for up-sampling the reconstructed current frame.

In one aspect, the receiving means, the extracting means, computing means, means for generating an attention map, means for generating an output and/or the displaying means may be the CPU 102, GPU 104, DSP 106 program memory associated with the CPU 102, the dedicated memory block 118, fully connected layers 362, NPU 428, and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for processing a video, performed by at least one processor, the processor implemented method comprising:
receiving the video as an input at an artificial neural network (ANN), the video comprising a sequence of frames;
extracting a set of features of a current frame of the video and a set of support features of a prior frame of the video, the set of support features comprising at least one support feature associated with a neighborhood of pixels of the prior frame, where the neighborhood of pixels of the prior frame is determined based on a position of a reference pixel of the current frame and where the neighborhood of pixels comprises a subset of pixels of the prior frame, the subset of pixels being less than an entirety of pixels of the prior frame;
computing a similarity metric between the at least one support feature, associated with the neighborhood of pixels, of the set of support features of the prior frame and a reference feature of the reference pixel of the current frame;
generating an attention map based on the similarity metric; and
generating an output comprising a reconstruction of the current frame based on the attention map.

2. The processor-implemented method of claim 1, further comprising displaying the output.

3. The processor-implemented method of claim 1, in which the reconstruction of the current frame includes an adjusted alignment of one or more pixels of the current frame.

4. The processor-implemented method of claim 1, further comprising computing the similarity metric for a subset of pixels of the current frame where the subset of pixels is less than an entirety of pixels of the current frame.

5. The processor-implemented method of claim 4, further comprising applying a sparsity objective to determine a number of pixels of the entirety of pixels of the current frame in the subset of pixels of the current frame for which the similarity metric is computed.

6. The processor-implemented method of claim 4, further comprising determining the subset of pixels of the current frame based on a residual frame, the residual frame comprising a difference between the current frame and the prior frame.

7. An apparatus for processing a video, comprising:
at least one memory; and
at least one processor coupled to the at least one memory, the at least one processor configured:
to receive the video as an input at an artificial neural network (ANN), the video comprising a sequence of frames;
to extract a set of features of a current frame of the video and a set of support features of a prior frame of the video, the set of support features comprising at least one support feature associated with a neighborhood of pixels of the prior frame, where the neighborhood of pixels of the prior frame is determined based on a position of a reference pixel of the current frame and where the neighborhood of pixels comprises a subset of pixels of the prior frame, the subset of pixels being less than an entirety of pixels of the prior frame;

to compute a similarity metric between the at least one support feature, associated with the neighborhood of pixels, of the set of support features of the prior frame and a reference feature of the reference pixel of the current frame;

to generate an attention map based on the similarity metric; and to generate an output comprising a reconstruction of the current frame based on the attention map.

8. The apparatus of claim 7, in which the at least one processor is further configured to display the output.

9. The apparatus of claim 7, in which the reconstruction of the current frame includes an adjusted alignment of one or more pixels of the current frame.

10. The apparatus of claim 7, in which the at least one processor is further configured computing the similarity metric for a subset of pixels of the current frame where the subset of pixels is less than an entirety of pixels of the current frame.

11. The apparatus of claim 10, in which the at least one processor is further configured to apply a sparsity objective to determine a number of pixels of the entirety of pixels of the current frame in the subset of pixels of the current frame for which the similarity metric is computed.

12. The apparatus of claim 10, in which the at least one processor is further configured to determine the subset of the entirety of pixels of the current frame based on a residual frame comprising a difference between the current frame and the prior frame.

13. A non-transitory computer-readable medium having program code recorded thereon, the program code executed by a processor and comprising:

program code to receive a video as an input at an artificial neural network (ANN), the video comprising a sequence of frames;

program code to extract a set of features of a current frame of the video and a set of support features of a prior frame of the video, the set of support features comprising at least one support feature associated with a neighborhood of pixels of the prior frame, where the neighborhood of pixels of the prior frame is determined based on a position of a reference pixel of the current frame and where the neighborhood of pixels comprises a subset of pixels of the prior frame, the subset of pixels being less than an entirety of pixels of the prior frame;

program code to compute a similarity metric between the at least one support feature, associated with the neighborhood of pixels, of the set of support features of the prior frame and a reference feature of the reference pixel of the current frame;

program code to generate an attention map based on the similarity metric; and program code to generate an output comprising a reconstruction of the current frame based on the attention map.

14. The non-transitory computer-readable medium of claim 13, in which the program code further comprises program code to display the output.

15. The non-transitory computer-readable medium of claim 13, in which the reconstruction of the current frame includes an adjusted alignment of one or more pixels of the current frame.

16. The non-transitory computer-readable medium of claim 13, in which the program code further comprises program code to computing the similarity metric for a subset of pixels of the current frame where the subset of pixels is less than an entirety of pixels of the current frame.

17. The non-transitory computer-readable medium of claim 16, in which the program code further comprises program code to apply a sparsity objective to determine a number of pixels of the entirety of pixels of the current frame in the subset of pixels of the current frame for which the similarity metric is computed.

18. The non-transitory computer-readable medium of claim 13, in which the program code further comprises program code to determine the subset of the entirety of pixels of the current frame based on a residual frame comprising a difference between the current frame and the prior frame.

19. An apparatus for processing a video, comprising:

means for receiving the video as an input at an artificial neural network (ANN), the video comprising a sequence of frames;

means for extracting a set of features of a current frame of the video and a set of support features of a prior frame of the video, the set of support features comprising at least one support feature associated with a neighborhood of pixels of the prior frame, where the neighborhood of pixels of the prior frame is determined based on a position of a reference pixel of the current frame and where the neighborhood of pixels comprises a subset of pixels of the prior frame, the subset of pixels being less than an entirety of pixels of the prior frame;

means for computing a similarity metric between the at least one support feature, associated with the neighborhood of pixels, of the set of support features of the prior frame and a reference feature of the reference pixel of the current frame;

means for generating an attention map based on the similarity metric; and means for generating an output comprising a reconstruction of the current frame based on the attention map.

20. The apparatus of claim 19, further comprising means for further comprising displaying the output.

21. The apparatus of claim 19, in which the reconstruction of the current frame includes an adjusted alignment of one or more pixels of the current frame.

22. The apparatus of claim 19, further comprising means for computing the similarity metric for a subset of pixels of the current frame where the subset of pixels is less than an entirety of pixels of the current frame.

23. The apparatus of claim 22, further comprising means for applying a sparsity objective to determine a number of pixels of the entirety of pixels of the current frame in the subset of pixels of the current frame for which the similarity metric is computed.

24. The apparatus of claim 19, further comprising means for determining the subset of the entirety of pixels of the current frame based on a residual frame comprising a difference between the current frame and the prior frame.

* * * * *